United States Patent [19]

Strong et al.

[11] 3,911,144

[45] Oct. 7, 1975

[54] EGG PRODUCT

[75] Inventors: David R. Strong, Norwalk, Conn.; Sutton Redfern, White Plains, N.Y.

[73] Assignee: Standard Brands Incorporated, New York, N.Y.

[22] Filed: Sept. 1, 1972

[21] Appl. No.: 285,775

[52] U.S. Cl. ............... 426/588; 426/614; 426/658; 426/330.1
[51] Int. Cl. .............................................. A23l 1/32
[58] Field of Search ........... 426/167, 211, 348, 196, 426/327, 363, 362, 189

[56] References Cited
UNITED STATES PATENTS

| | | | |
|---|---|---|---|
| 3,475,180 | 10/1969 | Jones | 426/185 |
| 3,507,664 | 4/1970 | Schuppner | 426/167 |
| 3,594,183 | 7/1971 | Melnick et al. | 426/167 |
| 3,676,157 | 7/1972 | Wintersdorff | 426/363 |

*Primary Examiner*—A. Louis Monacell
*Assistant Examiner*—R. A. Yoncoskie

[57] ABSTRACT

A substantially cholesterol free liquid egg product comprising egg white and a sufficient amount of xanthan gum to impart to said liquid egg product a degree of freeze-thaw stability greater than the freeze-thaw stability of a substantially cholesterol free liquid egg product not containing xanthan gum.

12 Claims, No Drawings

EGG PRODUCT

THE INVENTION

This invention relates to a substantially cholesterol free liquid egg product. More particularly, this invention relates to a substantially cholesterol free egg product comprising egg white and xanthan gum.

Eggs have long been considered to be among the most nutritionally valuable of foods for human consumption. Egg protein is of exceptional nutritional quality and is, in fact, used as a standard against which the nutritional efficiency of other food proteins is evaluated. Egg protein is found in both the white portion of the egg and in the yolk. Fat and cholesterol, on the other hand, are concentrated in the yolk. According to Composition of Foods, Agricultural Handbook No. 8, U.S. Department of Agriculture (1963), 100 grams of whole egg, edible portion (approximately 2 large eggs), provides about 4 grams of saturated fat and 550 mg. of cholesterol.

It is now generally believed that high blood cholesterol levels in humans are implicated in the onset and/or severity of cardiovascular disease. The amount of saturated fat ingested is also, in some manner, believed to be a factor in promoting the development of elevated blood cholesterol levels. Polyunsaturated fat, i.e., linoleic acid, on the other hand, is considered to be effective in lowering cholesterol levels. With the emphasis now being placed on the importance of reducing the dietary intake of cholesterol and saturated fat, many medical and nutrition authorities recommend that the intake of a number of highly popular foods, including eggs, be restricted or that their use be eliminated entirely, in some instances. There is evidence that egg yolk cholesterol may be particularly effective in increasing the level of cholesterol in the blood. As a result, many people have been required to drastically reduce the number of eggs in their diets and are thus deprived of foods which have traditionally been considered among the most enjoyable and nutritious of foods.

Most of the eggs produced in this country are consumed at home, where they are eaten directly or used in cooking and baking, or they are used in commercial production of baked goods. Whether used at home or in the bakery, eggs are expected to meet high standards of quality and performance. A large number of specialized egg products are available to the baking industry which meet the requirements for convenience and performance. Here too, however, it is likely that concern over the cholesterol and saturated fat contents of products containing whole eggs may be having a deleterious effect on consumer acceptance of the same. Presently available modified egg products have not been well accepted by the public. Generally, these products have failed to meet the organoleptic expectations of consumers or have not performed adequately in cooking and baking functions.

There are a number of patents which are directed to providing egg products having organoleptic characterics similar to whole eggs but having reduced calorie content and/or cholesterol levels. Exemplary of such patents are U.S. Pat. No. 3,207,609 to Gorman et al., U.S. Pat. No. 3,475,180 to Jones and U.S. Pat. No. 3,563,765 to Melnick.

In order for a substantially cholesterol free liquid egg product to be acceptable to the consumer, it must be substantially similar to whole eggs in respect to functional and organoleptic properties. When a low cholesterol egg product is supplied in a frozen form and it is thawed before use there is a tendency for the product to separate into two distinct layers. The top layer will be opaque while the bottom layer will be relatively clear. The degree to which separation may occur is a measure of the freeze-thaw stability of the product. It is, of course, desirable that a low cholesterol egg product have a relatively high degree of freeze-thaw stability so that little or no separation occurs upon thawing, thereby enabling the consumer to use the thawed product directly without mixing or the like being required. The viscosity of a low cholesterol liquid egg product should be substantially similar to that of whole fresh eggs and the texture of the egg product when cooked, for example, when scrambled, should also be substantially the same as that of cooked whole eggs.

It is the principal object of the present invention to provide a substantially cholesterol free liquid egg product having a relatively high degree of freeze-thaw stability.

This object and other objects of the present invention which will be apparent from the following description may be attained in accordance with the present invention by providing a substantially cholesterol free liquid egg product comprising egg white and a sufficient amount of xanthan gum to impart to said liquid egg product a degree of freeze-thaw stability greater than the freeze-thaw stability of a substantially cholesterol free liquid egg product not containing xanthan gum.

Xanthan gum is a complex polysaccharide derived from the microorganism Xanthomonas campestris. This polysaccharide is linear in structure and contains D-glucose, D-mannose and D-glucuronic acid and is generally supplied as the sodium, potassium or calcium salt. A commercial source of this material is the product Ketrol F, marketed by Kelco Co. The amount of xanthan gum present in the substantially cholesterol free liquid egg product may vary over a relatively wide range, for example, from about 0.005 to about 0.3 percent. It is preferred, however that the amount of xanthan gum be in the range of from about 0.01 to about 0.2 percent and it is most preferred that the xanthan gum be in the range of from about 0.02 to about 0.10 percent. At the relatively high levels of xanthan gum, the viscosity of the liquid egg product becomes increasingly higher and the texture of the scrambled liquid egg product becomes less egg-like.

While xanthan gum alone improves the freeze-thaw stability of the liquid egg product, it is desirable to incorporate into the product another gum slected from the group consisting of carboxymethyl cellulose and guar gum and mixtures thereof. The presence of these gums in addition to xanthan gum provides a number of benefits. For instance, they impart to the liquid egg product a viscosity which is similar to that of whole eggs, they reduce the tendency toward separation, commonly referred to as syneresis, in scrambled egg prepared from the liquid egg product and they further improve the freeze-thaw stability of the liquid egg product.

Commercial sources of carboxymethyl cellulose and guar gum, suitable for the purposes of the present invention, are marketed under the trade names of CMC 7MF by Hercules, Inc. and Jaguar A-20-D by Stein-Hall & Co., Inc., respectively. The amount of carboxymethyl cellulose which may be present is preferably from about 0.04 to about 0.20 percent and most preferably from about 0.12 to about 0.16 percent. The amount of guar gum which may be present in the liquid egg product is preferably in the range of from about 0.04 to about 0.20 percent and most preferably from about 0.12 to about 0.16 percent.

The egg white is responsible to a significant degree for providing desirable organoleptic and functional characteristics in the egg product. It is preferred that the principal protein source in the egg composition consist essentially of egg white. Other protein sources such as soya protein, whey and casein derivatives when present in the egg product seems to impart, in certain instances, an undesirable flavor and deleteriously affect the functional characteristics of the product. If very samll amounts of these materials are present, of course, their effect may not be sufficiently discernible to be detrimental.

The amount of egg white present may be from about 24 to about 95.5 percent by weight. Preferably, however, the amount of egg white present is from about 40 to about 95 percent and most preferably the egg white present is from about 70 to about 90 percent.

It is desirable to have present in the egg product of the present invention nonfat dry milk solids. Nonfat dry milk solids supply additional protein to the egg product and also seem to impart certain desirable functional characteristics. For example, when the liquid egg product is cooked, i.e., scrambled, the nonfat dry milk affects the texture of the product to an extent that it is more like a scrambled egg prepared from whole eggs. It also serves to control, to a certain extent, the separation of water from the cooked product.

The amount of nonfat dry milk which is present in the product may vary over a relatively wide range, for instance from about 0.10 to about 15 percent. Preferably, however, the amount of nonfat dry milk which is present is from about 0.10 to about 10 percent and most preferably from about 3 to about 8 percent. Amounts of nonfat dry milk within the most preferred range impart a desirable flavor to the egg product and as the amount thereof is increased to higher levels the flavor imparted becomes progressively stronger. This strong flavor may be considered by certain consumers as undesirable.

It is desirable to have lecithin present in the liquid egg product. The function of the lecithin is principally to prevent the product from sticking to the vessel in which it is cooked. Only relatively small amounts of lecithin are necessary to achieve this objective, for instance from about 0.05 to about 1.2 percent. Preferably the amount of lecithin present is from about 0.1 to about 0.9 precent and most preferably the amount of lecithin present is from about 0.25 to about 0.35 percent.

For the present product to be acceptable to the consumer it should be colored so that it has the characteristic color of whole eggs. It is preferred that the colorant comprises of a mixture of beta-carotene and an extract of plant xanthophylls in suitable proportions and amounts to impart to the egg composition the characteristic color of whole eggs. Beta-carotene and an extract of plant xanthopylls are oil soluble and water insoluble. It is contemplated that other oil soluble colorants may be used as well as water soluble colorants.

Preferably, the substantially cholesterol free egg product contains vegetable oil. The amount of oil which may be present may vary widely, for instance, up to about 40 percent. However, at high oil levels when the liquid egg product is scrambled, the scrambled egg product becomes increasingly soft and mushy. When an oil soluble colorant is used in the product it is recommended that it be first be dissolved in a small amount of vegetable oil so that it can be dispersed substantially evenly throughout the liquid egg product. Generally, only small amounts of oil are necessary to form the dispersion, for example, about 0.1 percent. It is also recommended that when other oil soluble ingredients, for example, lecithin and emulsifiers are used in the preparation of the egg product, that they be dissolved in oil prior to being incorporated into the egg product. When oil soluble colorants and other oil soluble ingredients are used, for example lecithin and emulsifiers, amounts of oil of from about 1 to about 2 percent may be required to form a solution thereof. These small amounts of oil do not seem to affect the organoleptic properties of the egg product. It is preferred that the egg product contain from about 9 to about 13 percent oil which is similar to the percentage of fat naturally present in whole eggs. However, these amounts of oil also seem to impart certain subtle organoleptic characteristics to the egg product. For instance, when the liquid egg product is scrambled, the oil appears to impart mouth feel and texture similar to that of scrambled whole eggs.

The oil or fat naturally present in egg yolk contains a relatively large amount of cholesterol and has a relatively high saturated fat content. Vegetable oils, on the other hand, do not contain cholesterol and have a relatively low saturated fat content. Exemplary of vegetable oils which may be used in the present product are corn, cottonseed, soybean, safflower, sunflower, peanut, rape seed, olive, and sesame oils and mixtures thereof. The preferred vegetable oil is corn oil.

Generally, egg white commercially available contains traces of egg yolk, for instance less than about 0.1 percent. This is due to methods by which the white is separated from the yolk.

A variety of methods may be used to form the preferred liquid egg product of the present invention. However, for ease of manufacturing and other reasons it is desirable that in the case of preparing an egg product containing a vegetable oil, that a minor portion of the total oil used, i.e., about 15 percent, be first added to the liquid egg white. The oil prevents foaming of the egg white when the other ingredients are subsequently incorporated through vigorous agitation into the composition. Then, the nonfat dry milk solids are added with thorough mixing to rehydrate the same. If all the oil were present prior to the nonfat dry milk being added, rehydration of the milk solids would be somewhat difficult to accomplish. Flavoring agents, xanthan gum or a mixture of xanthan gum and carboxymethyl cellulose or guar gum, vitamins and minerals may be incorporated next into the mixture. Since only small amounts of these materials would generally be required, care must be taken to make certain that they are essentially evenly dispersed throughout the product. In this respect, a convenient mode of incorporating these materials is to dilute them somewhat with a minor proportion of the total nonfat dry milk solids used to form a "pony" and mix this pony with the product. The remaining portion of the oil may be added prior or subsequent to the addition of the above referred to "pony".

A small amount of the total oil may be used to act as a carrier for the lecithin and oil soluble colorants and vitamins. To form a dispersion of these ingredients in the oil, it is advantageous to heat the oil and incorporate these ingredients into the hot oil. Temperatures in the range of from about 130° to about 150°F. have provided satisfactory results. This hot mixture may be incorporated with mixing directly into the liquid product.

It is preferred that the liquid egg product of the present invention be pasteurized. Although egg products are processed under stringent sanitary conditions, there is the possiblity that they may be infected with undesirable microorganisms. In egg processing, Salmonella bacteria are of greatest concern. These microorganisms and others may be eliminated by a pasteurization treatment. However, due to the heat sensitivity of the egg products of the present invention, the pasteurization treatment must be such that it does not cause coagulation and/or denaturation of the egg white protein. Additionally, it must not cause discoloration, development of off-flavors, etc. A generally suitable pasteurization treatment is described in U.S. Pat. No. 3,251,697 to Lineweaver. The preferred salt of a polyvalent metal is aluminum sulfate.

In order to more clearly describe the nature of the present invention, specific examples will be hereinafter described. It should be understood, however, that this is done solely by way of example and is intended neither to delineate the scope of the invention nor limit the ambit of the appended claims. In the examples and throughout this specification, percentages are utilized to refer to percent by weight and are based on the weight of the substantially cholesterol free egg product of the present invention.

EXAMPLE I

This Example illustrates the effect of using xanthan gum or a mixture of xanthan gum and other gums on the freeze-thaw stability of a substantially cholesterol free liquid egg product and the effect of these gums on the texture of a scrambled egg product.

A substantially cholesterol free liquid egg product was prepared containing the following percentages of ingredients.

81.6 % pasteurized liquid egg white
0.12 % trisodium citrate
0.008 % triethyl citrate
0.0075 % aluminum sulfate
11.8 % corn oil
5.7 % nonfat dry milk solids
0.29 % lecithin
0.25 % Myvatex 3-50 (a blend of mono- and diglycerides and propylene glycol monostearate manufactured by D. P. I. Div., Eastman Chemical Products Co.)
0.0066% colorants comprising 0.0027% beta-carotene (30% dispersion in oil) and 0.0039% Pigmentene Yellow-Gold (an extract of plant xanthophylls sold by Special Nutrients, Inc., Surfside, Florida)
0.0064% comprising flavoring, minerals and water - and fat soluble vitamins.

The above liquid egg product was prepared by first combining the nonfat milk solids, aluminum sulfate, minerals and water-soluble vitamins.

To each of a number of equal portions of this mixture were added varying amounts of xanthan gum alone or xanthan gum and carboxymethyl cellulose or guar gum. Each portion of the mixture containing the gum or gums was then incorporated separately into pasteurized liquid egg white containing the trisodium citrate and triethyl citrate. The corn oil, Myvatex 3-50, lecithin, flavoring and fat soluble vitamins were combined, heated to 140° to 150°F. and added to the egg white. The total ingredient mixes were homogenized at 2000 psi through a Chase-Logeman model C8 laboratory homogenizer and pasteurized by heating at a temperature of about 136°F. for 5 minutes. After cooling to room temperature, approximately 800 ml. of each liquid egg product was placed in a round, transparent plastic container four inches in height and having a diameter of five inches. The containers were placed in a freezer and held at −20°F. for 24 hours following which the egg products were thawed by holding the containers at 65°F. for 20 hours. The height of the relatively clear liquid layer at the bottom of the containers was measured and compared to the overall height of the product in the containers. The percent freeze-thaw separation of the liquid egg product in each container was calculated by the following equation: Percent Separation = height of relatively clear bottom layer (cm.)/overall height of product in the container (cm.) × 100

The effects on freeze-thaw separation of the liquid egg product and on the texture of the cooked egg product using xanthan gum alone or together with carboxymethyl cellulose or guar gum are shown in Table I.

Table I

| Per Cent Xanthan Gum (Keltrol F) | Per Cent Carboxymethyl Cellulose (CMC 7MF) | Per Cent Guar Gum (Jaguar A-20-D) | Per Cent Separation | Texture of Scrambled Product (Observations) |
| --- | --- | --- | --- | --- |
| control (no gums added) | — | — | 49 | poor |
| 0.1 | — | — | 22 | good |
| 0.2 | — | — | 15 | fair |
| 0.3 | — | — | 0 | poor |
| 0.050 | 0.160 | — | 24 | excellent |
| 0.035 | — | 0.150 | 9.3 | " |
| 0.050 | — | 0.140 | 3.6 | " |
| 0.074 | — | 0.135 | 1.5 | " |
| 0.084 | — | 0.130 | 1.5 | " |
| 0 | 0.160 | — | 29 | good |

Observations concerning the texture of the scrambled egg products were made by comparing the mouth feel and resistance to chewing of the scrambled products with the same characteristics of scrambled eggs made from whole fresh eggs.

It was also observed that the above scrambled egg products containing carboxymethyl cellulose or guar gum in addition to xanthan gum were considered to have a more egg-like viscosity than the scrambled egg products containing no gums or containing xanthan gum alone.

EXAMPLE II

This Example illustrates a method of preparing a substantially cholesterol free liquid egg product.

To 3,264 pounds of liquid egg white at a temperature of from 32° to 45°F. were added 71 pounds of corn oil and 200 pounds of nonfat dry milk solids. These ingredients were throughly mixed. A blended mixture of dry ingredients was prepared comprising 6.39 pounds of CMC 7MF, 1.97 pounds of Keltrol F, 0.3 pounds of anhydrous aluminum sulfate, 0.17 pounds of ferric orthophosphate, 0.0044 pounds of thiamine mononitrate, 0.0044 pounds of riboflavin and 28.5 pounds of nonfat dry milk and the mixture added to the previously combined materials with thorough mixing. To this mixture was then added 329 pounds of corn oil at ambient temperature with agitation to produce a base mixture. 75 pounds of corn oil was heated to from 130° to 150°F. with mixing and then 11.7 pounds of lecithin and 10 pounds of MYvatex 3-50 were added. After mixing for 10 to 15 minutes a small amount of a flavoring agent and a mixture comprising 0.157 pounds of PIGMENTENE Yellow-Gold, 0.11 pounds of a 30 percent dispersion of beta-carotene and 0.0000018 pounds of vitamin $D_2$ in oil was added and thoroughly mixed. This hot mixture was added to the base mixture with blending.

The total ingredient mix was pasteurized by heating at a temperature of about 136°F. for 5 minutes and then was passed through a Manton-Gaulin two stage homogenizer, the first stage being at 1000 psi and the second stage being at 500 psi. The homogenized product was tested for organoleptic properties and found to be similar to whole eggs.

The terms and expressions which have been employed are used as terms of description and not of limitation. It is not intended, in the use of such terms and expressions, to exclude any equivalents of the features shown and described or portions thereof, since it is recognized that various modifications are possible within the scope of the invention claimed.

What is claimed is:

1. A substantially cholesterol and egg yolk free liquid egg product comprising from about 24 to about 99.5 percent by weight egg white and from about 0.005 to about 0.3 percent by weight xanthan gum, the amount of xanthan gum being sufficient to impart to said liquid egg product a degree of freeze-thaw stability greater than the freeze-thaw stability of the substantially cholesterol free liquid egg product not containing xanthan gum.

2. A substantially cholesterol free liquid egg product as defined in claim 1, wherein the amount of xanthan gum is from about 0.01 to about 0.2 percent by weight based on the weight of the egg product.

3. A substantially cholesterol free liquid egg product as defined in claim 2, wherein the amount of xanthan gum is from about 0.02 to about 0.1 percent by weight based on the weight of the egg product.

4. A substantially cholesterol free liquid egg product as defined in claim 1, wherein there is present from about 0.04 to about 0.20 percent by weight carboxymethyl cellulose based on the weight of the egg product.

5. A substantially cholesterol free liquid egg product as defined in claim 4, wherein there is present from about 0.12 to about 0.16 percent by weight carboxymethyl cellulose based on the weight of the egg product.

6. A substantially cholesterol free liquid egg product as defined in claim 1, wherein there is present from about 0.04 to about 0.2 percent guar gum based on the weight of the egg product.

7. A substantially cholesterol free liquid egg product as defined in claim 6, wherein there is present from about 0.12 to about 0.16 percent guar gum based on the weight of the egg product.

8. A substantially cholesterol free liquid egg product as defined in claim 6, wherein there is present from about 70 to about 90 percent egg white based on the weight of the egg product.

9. A substantially cholesterol free liquid egg product as defined in claim 8, wherein there is present from about 3 to about 8 percent by weight nonfat dry milk solids based on the weight of the egg product.

10. A substantially cholesterol free liquid egg product as defined in claim 9, wherein there is present from about 9 to about 13 percent by weight of vegetable oil.

11. A substantially cholesterol free liquid egg product as defined in claim 10, wherein the vegetable oil is corn oil.

12. A substantially cholesterol free liquid egg product as defined in claim 10, wherein there is present from about 0.25 to about 0.35 percent lecithin.

* * * * *